US010008235B1

(12) United States Patent
Chang et al.

(10) Patent No.: US 10,008,235 B1
(45) Date of Patent: Jun. 26, 2018

(54) DISC GRABBING DEVICE AND OPERATING METHOD THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventors: Jung-Fang Chang, Taipei (TW); Cheng-Wen Huang, Taipei (TW); Ming-Chun Tsao, Taipei (TW); Chien-Shou Chen, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days. days.

(21) Appl. No.: 15/825,202

(22) Filed: Nov. 29, 2017

(30) Foreign Application Priority Data

Jul. 27, 2017  (CN) .......................... 2017 1 0626095

(51) Int. Cl.
*G11B 17/04* (2006.01)
*G11B 17/22* (2006.01)

(52) U.S. Cl.
CPC .......... *G11B 17/225* (2013.01); *G11B 17/223* (2013.01)

(58) Field of Classification Search
None
See application file for complete search history.

(56) References Cited

U.S. PATENT DOCUMENTS

| 3,253,832 | A  | * | 5/1966  | Tatter ..................... | G11B 17/16 369/208 |
| 6,111,847 | A  | * | 8/2000  | Assadian ............... | B25J 15/028 294/97 |
| 6,222,800 | B1 | * | 4/2001  | Miller ..................... | G11B 7/28 369/30.19 |
| 6,807,673 | B2 | * | 10/2004 | Takeshima ........... | G11B 17/021 720/706 |
| 6,883,173 | B1 | * | 4/2005  | Taniguchi ............ | G11B 17/021 369/30.78 |
| 7,032,232 | B2 | * | 4/2006  | Russ .................... | G11B 17/022 369/30.34 |
| 7,334,239 | B2 | * | 2/2008  | Kobayashi ............. | G11B 17/05 720/602 |
| 7,885,148 | B2 | * | 2/2011  | Ikeda .................... | G11B 23/40 369/30.03 |
| 8,843,946 | B2 | * | 9/2014  | Nishi ................... | G11B 17/053 369/30.52 |

(Continued)

*Primary Examiner* — William Joseph Klimowicz
(74) *Attorney, Agent, or Firm* — McClure, Qualey & Rodack, LLP

(57) ABSTRACT

A disc grabbing device including a body, a drive shaft, a first cam, a second cam, multiple first movable parts and multiple second movable parts are provided. The drive shaft is rotatably disposed in the body. A first cam and a second cam are disposed on the drive shaft, and rotate together with the drive shaft. The first movable parts are disposed in the body and correspond to the first cam, and move to a disc hold position or a disc release position along with the rotation of the first cam. The second movable parts are disposed in the body and correspond to the second cam, and move to a disc release position or a disc hold position along with the rotation of the second cam.

10 Claims, 10 Drawing Sheets

(56) References Cited

U.S. PATENT DOCUMENTS

| | | | |
|---|---|---|---|
| 9,123,379 B2 * | 9/2015 | Higaki | G11B 23/0323 |
| 9,227,324 B1 * | 1/2016 | Abdul Rashid | H01L 21/67781 |
| 9,761,265 B2 * | 9/2017 | Chihara | G11B 17/228 |
| 9,799,367 B1 * | 10/2017 | Zhu | G11B 17/038 |
| 9,953,677 B1 * | 4/2018 | Zhu | B25J 18/025 |
| 2002/0003754 A1 * | 1/2002 | Russ | G11B 17/022 |
| | | | 369/30.34 |
| 2003/0002400 A1 * | 1/2003 | Klein | G11B 17/08 |
| | | | 369/30.55 |
| 2009/0178066 A1 * | 7/2009 | Liu | G11B 17/056 |
| | | | 720/615 |
| 2010/0100895 A1 * | 4/2010 | Hernandez | G11B 17/08 |
| | | | 720/703 |
| 2013/0326549 A1 * | 12/2013 | Nishi | G11B 17/053 |
| | | | 720/615 |

* cited by examiner

DISC GRABBING DEVICE AND OPERATING METHOD THEREOF

This application claims the benefit of People's Republic of China application Serial No. 201710626095.1, filed Jul. 27, 2017, the subject matter of which is incorporated herein by reference.

BACKGROUND OF THE INVENTION

Field of the Invention

The invention relates in general to a grabbing device, and more particularly to a disc grabbing device and an operating method thereof.

Description of the Related Art

The disc archive system, which uses discs as a data storage medium, normally includes multiple disc drives, a disc library for placing multiple discs, and a disc grabbing device. The disc grabbing device is used for grabbing and releasing discs, and moving discs between the disc library and the disc drives. For example, the disc grabbing device grabs discs from the disc library and then moves and releases the discs to the disc drives, or grabs discs from the disc drive and then moves and releases the discs to the disc library. To increase the disc handling efficiency, the disc grabbing device may grab multiple discs and then move and release the multiple discs at one time. For example, the disc grabbing device may grab multiple discs from the disc library and then move and release the multiple discs to corresponding disc drives respectively. The disc grabbing device may pick up the discs from respective disc drives and then grab the discs on the disc grabbing device. Then, the disc grabbing device may place the grabbed discs back to the disc library.

Although the disc grabbing device can grab multiple discs and move the multiple discs at one time, the disc drive normally can only read singular disc. Therefore, how to provide a disc grabbing device capable of unloading singular disc to a corresponding disc drive from the multiple grabbed discs has become a prominent task for the industries.

SUMMARY OF THE INVENTION

The invention is directed to a disc grabbing device and an operating method thereof capable of grabbing and unloading discs using a dual-cam mechanism and an engage-and-release configuration between two corresponding sets of movable parts such that discs can be clamped and released.

According to one embodiment of the invention, a disc grabbing device used for grabbing multiple discs and sequentially unloading the discs is provided. The disc grabbing device includes a body, a drive shaft, a first cam, a second cam, multiple first movable parts and multiple second movable parts. The drive shaft is rotatably disposed in the body. The first cam and the second cam are disposed on the drive shaft and can be rotated together with the drive shaft. The first movable parts are disposed in the body and correspond to the first cam, and move to a disc hold position or a disc release position along with the rotation of the first cam. The second movable parts are disposed in the body and correspond to the second cam, and move to a disc release position and a disc hold position along with the rotation of the second cam. The disc grabbing device has a first operating state in which the first movable parts and the second movable parts are respectively located at the disc release positions. The disc grabbing device has a second operating state in which the first movable parts are located at the disc hold position, and the second movable parts are located at the disc release position. The disc grabbing device has a third operating state in which the first movable parts are located at the disc release position, and the second movable parts are located at the disc hold position.

According to another embodiment of the invention, an operating method of a disc grabbing device is provided. The disc grabbing device includes a drive shaft, a first cam and a second cam disposed on the drive shaft, a plurality of first movable parts corresponding to the first cam and a plurality of second movable parts corresponding to the second cam. The operating method includes following steps. When the disc grabbing device intends to grab a plurality of discs, the drive shaft drives the first cam and the second cam to rotate, such that the disc grabbing device enters a first operating state in which the first movable parts and the second movable parts are located at the disc release positions. The drive shaft drives the first cam and the second cam to rotate, such that the disc grabbing device enters a second operating state to complete the operation of grabbing discs, wherein in the second operating state, the first movable parts are located at the disc hold position, and the second movable parts are located at the disc release position. When the disc grabbing device intends to unload a disc, the drive shaft drives the first cam and the second cam to rotate, such that the disc grabbing device enters a third operating state in which the first movable parts are located at the disc release position, and the second movable parts are located at the disc hold position. The drive shaft drives the first cam and the second cam to rotate, such that the disc grabbing device enters the second operating state to complete the operation of disc unloading.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

Figure 1A:
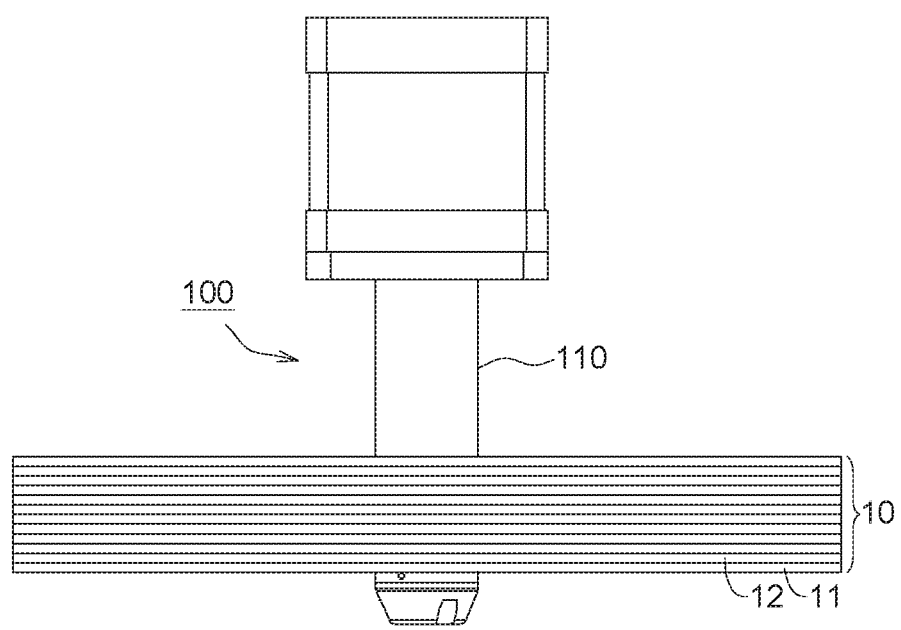
FIGS. 1A and 1B respectively are an appearance diagram and an internal structure diagram of a disc grabbing device according to an embodiment of the invention.
Figure 1B:
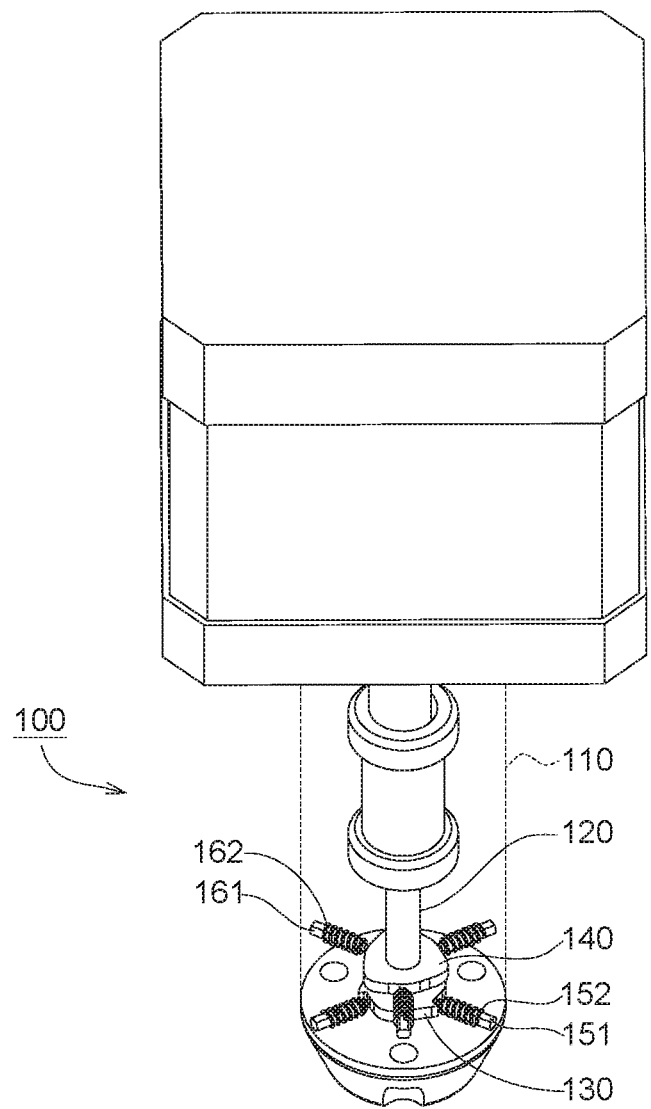

Referring to FIGS. 1A and 1B, an appearance diagram and an internal structure diagram of a disc grabbing device 100 according to an embodiment of the invention respectively are shown. In an embodiment of the invention, the disc grabbing device 100 grabs multiple discs 10 and sequentially unloads the discs 10 to corresponding disc drives. In the present embodiment, the disc grabbing device 100 can be inserted into the center hole of the discs 10, and can grab or unload discs by clamping or releasing the inner edge of the center hole of discs 10 using a dual-cam mechanism. In FIG. 1A, the disc grabbing device 100 grabs 12 discs 10, for example. The disc grabbing device 100 can sequentially move 12 discs 10 to the positions of 12 corresponding disc drives, and then unload each singular disc to a corresponding disc drive.

Refer to FIGS. 1A and 1B. The disc grabbing device 100 includes a body 110, a drive shaft 120, a first cam 130, a second cam 140, multiple first movable parts 151 and multiple second movable parts 161. The outer diameter of the body 110 is smaller than the inner diameter of the center hole of the discs 10, such that the body 110 can be inserted into the center hole of the discs 10. The drive shaft 120 is rotatably disposed inside the body 110, and can be driven to rotate by a motor (not illustrated), for example. In the present embodiment, the drive shaft 120 can change its rotation direction. That is, the drive shaft 120 can be driven to rotate forwardly or reversely.

The first cam 130 and the second cam 140 are disposed on the drive shaft 120 and can be rotated together with the drive shaft 120. The first cam 130 is located under the second cam 140. In the present embodiment, since the drive shaft 120 can be driven to rotate forwardly or reversely, the first cam 130 and the second cam 140 can also be driven to rotate forwardly or reversely.

The first movable parts 151 and the second movable parts 161 correspond to the first cam 130 and the second cam 140, respectively. The first movable parts 151 are relatively located under the second movable parts 161. In the present embodiment, when the disc grabbing device 100 grabs discs, the positions of the second movable parts 161 correspond to the second bottommost disc of the grabbed discs 10. In the example of FIG. 1A, the disc grabbing device 100 grabs multiple discs 10 including the first disc 11, the second disc 12 and so on counted from the bottom of the discs 10, and the positions of the second movable parts 161 correspond to the position of the second disc 12, the positions of the first movable parts 151 correspond to the underneath of the position of the first disc 11 as indicated in FIGS. 2C and 2D.

It should be noted that each time when the disc grabbing device 100 unloads discs, the disc grabbing device 100 will unload discs starting from the bottommost disc of the multiple discs 10. In the example of FIG. 1A, the disc grabbing device 100 will firstly unload the first disc 11 and then unload the second disc 12, and the rest can be obtained by analogy.

Figure 2A:
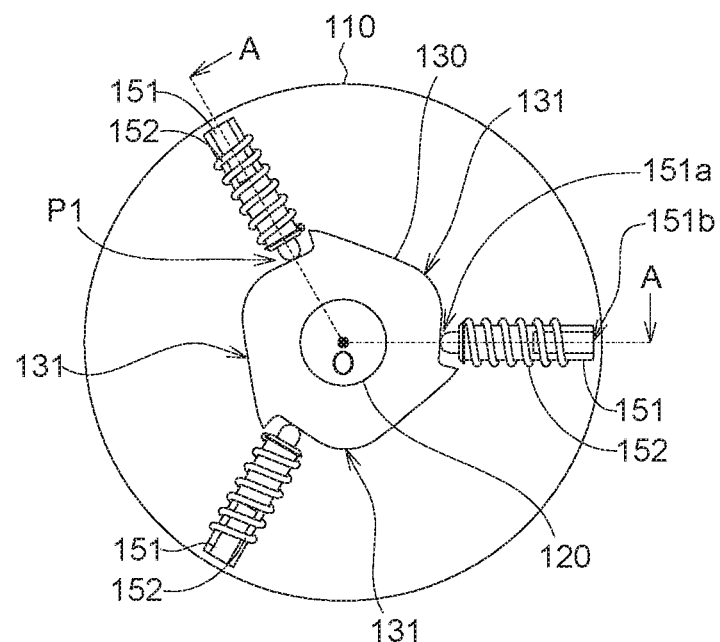
FIGS. 2A and 2B respectively are schematic diagrams of first movable parts and second movable parts when a disc grabbing device is in a first operating state.
Figure 2B:
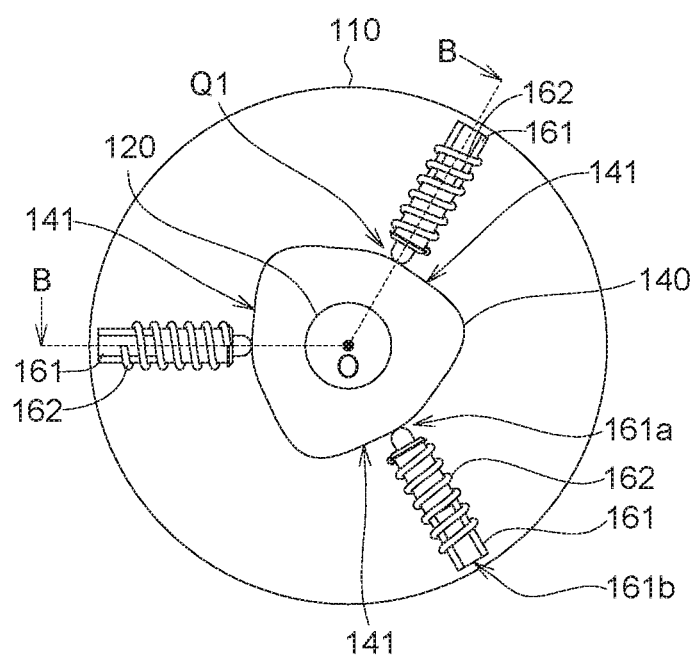
Figure 2C:
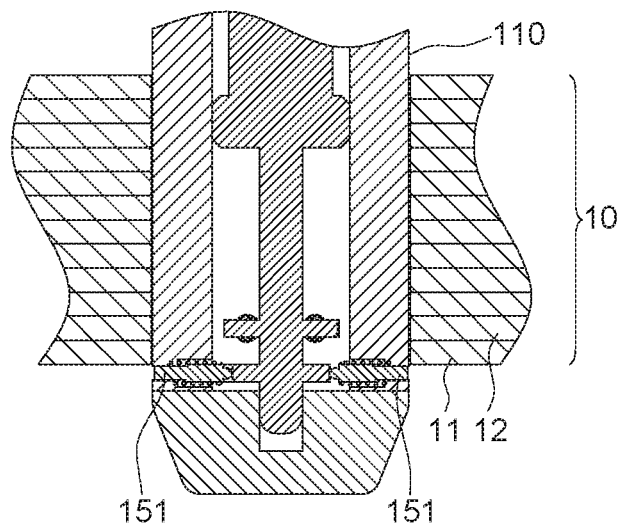
FIGS. 2C and 2D respectively are cross-sectional views of a disc grabbing device along a cross-sectional line A-A of FIG. 2A and a cross-sectional line B-B of FIG. 2B.
Figure 2D:
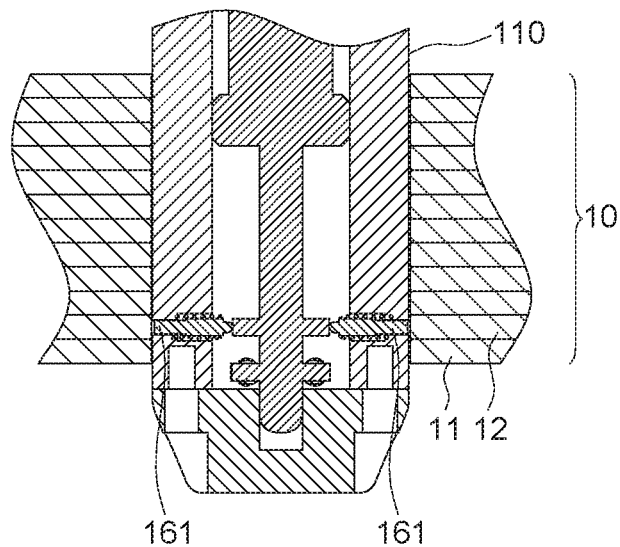

FIGS. 2A and 2B are schematic diagrams of first movable parts 151 and second movable parts 161 when a disc grabbing device 100 is in a first operating state. FIGS. 2C and 2D respectively are cross-sectional views of a disc grabbing device along a cross-sectional line A-A of FIG. 2A and a cross-sectional line B-B of FIG. 2B.

Refer to FIGS. 1B and 2A-2D. The first movable parts 151 are disposed in the body 110 and have a first end 151$a$ and a second end 151$b$, respectively. The first ends 151$a$ of the first movable parts 151 contact the first cam 130, such that the first movable parts 151 can be moved to a disc hold position or a disc release position along with the rotation of the first cam 130. When the first movable parts 151 are located at the disc release position, the second ends 151$b$ of the first movable parts 151 are located inside the body 110. When the first movable parts 151 are located at the disc hold position, the second ends 151$b$ of the first movable parts 151 are located outside the body 110. The second movable parts 161 are disposed in the body 110 and have a first end 161$a$ and a second end 161$b$, respectively. The first ends 161$a$ of the second movable parts 161 contact the second cam 140, such that the second movable parts 161 can be moved to a disc release position or a disc hold position along with the rotation of the second cam 140. When the second movable parts 161 are located at the disc release position, the second ends 161$b$ of the second movable parts 161 are located inside the body 110. When the second movable parts 161 are located at the disc hold position, the second ends 161$b$ of the second movable parts 161 are located outside the body 110. In the present embodiment, terminologies such as "the first" and "the second" can be used to describe various elements. However, it should be understood that the elements are not limited by these terminologies. Without breaching the scope of the embodiments, the first end can also be referred as the second end. Similarly, the second end can also be referred as the first end.

Refer to FIGS. 2A-2D. When the first cam 130 and the second cam 140 are in the first operating state, the first movable parts 151 and the second movable parts 161 are located at the disc release positions. That is, the second ends 151$b$ of the first movable parts 151 and the second ends 161$b$ of the second movable parts 161 both are located inside the body 110.

Refer to FIGS. 1B and 2A-2D. The disc grabbing device 100 further includes multiple first elastic parts 152 and multiple second elastic parts 162, the multiple first elastic parts 152 correspond to multiple first movable parts 151 and the multiple second elastic parts 162 correspond to multiple second movable parts 161. The first elastic parts 152 are used for providing elastic forces to the corresponding first movable parts 151, such that the first movable parts 151 can return to the disc release position. The second elastic parts 162 are used for providing elastic forces to the corresponding second movable parts 161, such that the second movable parts 161 can return to the disc release position.

In an embodiment, the first elastic parts 152 can be mounted on the first movable parts 151 and lean between the body 110 and the first movable parts 151, and the second elastic parts 162 can be mounted on the second movable parts 161 and lean between the body 110 and the second movable parts 161.

In an embodiment as indicated in FIGS. 1B, 2A and 2B, both the first movable parts 151 and the second movable parts 161 have a quantity of 3; both the first elastic parts 152 and the second elastic parts 162 also have a quantity of 3; any two first movable parts 151 or any two second movable parts 161 form an angle with respect to the center O of the drive shaft 120 can be 120° to form a three-point positioning structure.

In an embodiment as indicated in FIGS. 1B, 2A and 2B, the first movable parts 151 and the second movable parts 161 can be staggered with each other. That is, the first movable parts 151 and the second movable parts 161 are located at different azimuths. For example, the first movable parts 151 are located at the azimuths of 0°, 120°, 240°, and the second movable parts 161 are located at the azimuths of 60°, 180°, 300°.

In the disc grabbing device 100 of the embodiments of the invention, through the contour design of the first cam 130 and the second cam 140, when the first cam 130 and the second cam 140 are rotated, the contours of the first cam 130 and the contours of the second cam 140 can respectively lead the first movable parts 151 and the second movable parts 161 to move.

In the present embodiment, the first cam 130 has multiple first drive contours 131 corresponding to multiple first movable parts 151 whose first ends 151a lean on the first drive contours 131. When the first cam 130 is rotated, the first drive contours 131 can lead the first movable parts 151 to move. In an embodiment as indicated in FIG. 2A, the first cam 130 has three first drive contours 131 respectively corresponding to three first movable parts 151. In the present embodiment, the second cam 140 has multiple second drive contours 141 corresponding to multiple second movable parts 161 whose first ends 161a lean on the second drive contours 141. When the second cam 140 is rotated, the second drive contours 141 can lead the second movable parts 161 to move. In an embodiment as indicated in FIG. 2B, the second cam 140 has three second drive contours 141 respectively corresponding to three second movable parts 161.

In the embodiments of the invention, designs of the contour of the first cam 130 and the contour of the second cam 140 respectively can lead the first movable parts 151 and the second movable parts 161 to move, such that the disc grabbing device 100 can have multiple operating states in which the operations of grabbing multiple discs and unloading singular disc can be achieved. In the operating method disclosed below, the disc grabbing device 100 grabs multiple discs and unloads singular disc in four operating states. The operating method of the disc grabbing device 100 in different operating states is exemplified by the operations of the first movable parts 151 and the second movable parts 161.

First Operating State:

Refer to FIGS. 2A-2D. FIGS. 2A and 2B respectively are schematic diagrams of first movable parts 151 and second movable parts 161 when the disc grabbing device 100 is in a first operating state. FIGS. 2C and 2D respectively are cross-sectional views of the disc grabbing device 100 along a cross-sectional line A-A of FIG. 2A and a cross-sectional line B-B of FIG. 2B.

As indicated in FIG. 2A-2D, when the disc grabbing device 100 is in the first operating state, the first movable parts 151 and the second movable parts 161 are respectively located at an initial position, the first ends 151a of the first movable parts 151 are located at initial points P1 on corresponding first drive contours 131; the first ends 161a of the second movable parts 161 are located at initial points Q1 on corresponding second drive contours 141. The first movable parts 151 and the second movable parts 161 are located at the disc release positions. That is, the second ends 151b of the first movable parts 151 and the second ends 161b of the second movable parts 161 are located inside the body 110. As indicated in FIGS. 2C and 2D, when the disc grabbing device 100 is in the first operating state, the second ends 151b of the first movable parts 151 and the second ends 161b of the second movable parts 161 are located inside the body 110, therefore the body 110 of the disc grabbing device 100 can be inserted into the center hole of the multiple discs 10 and prepares to grab the discs.

Figure 3A:
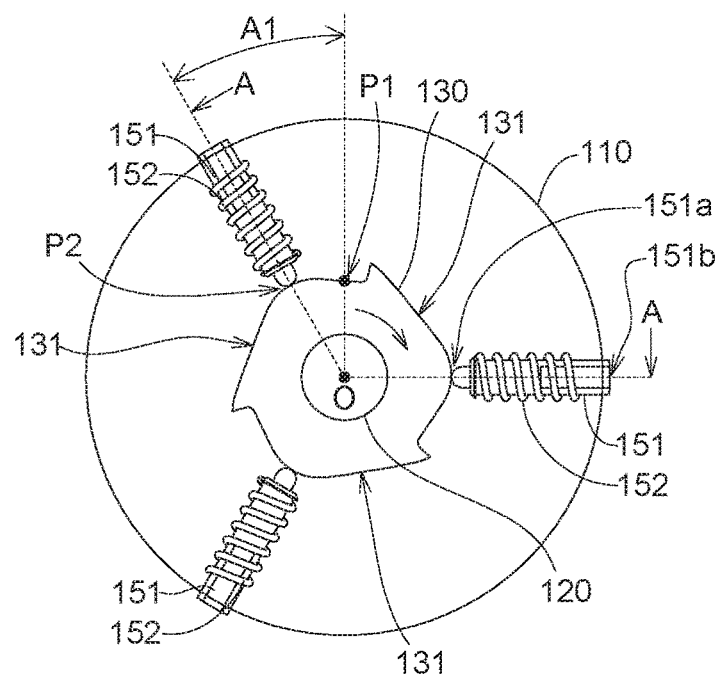
FIGS. 3A and 3B respectively are schematic diagrams of first movable parts and second movable parts when a disc grabbing device is in a second operating state.
Figure 3B:
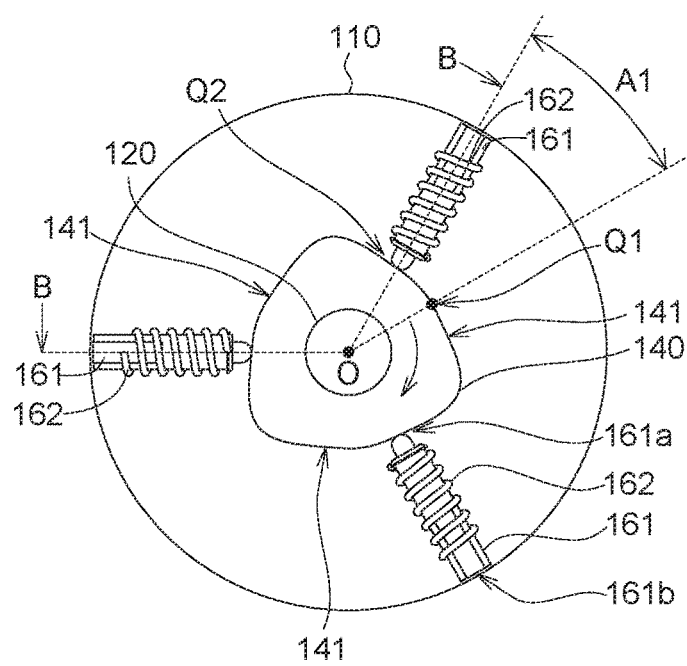
Figure 3C:
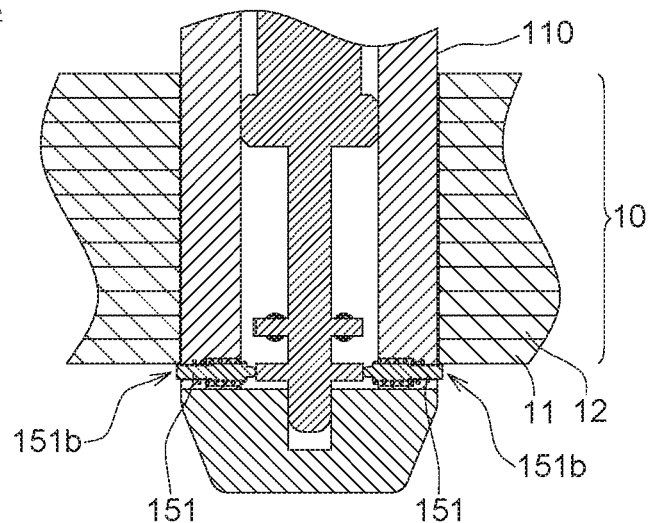
FIGS. 3C and 3D respectively are cross-sectional views of a disc grabbing device along a cross-sectional line A-A of FIG. 3A and a cross-sectional line B-B of FIG. 3B.
Figure 3D:
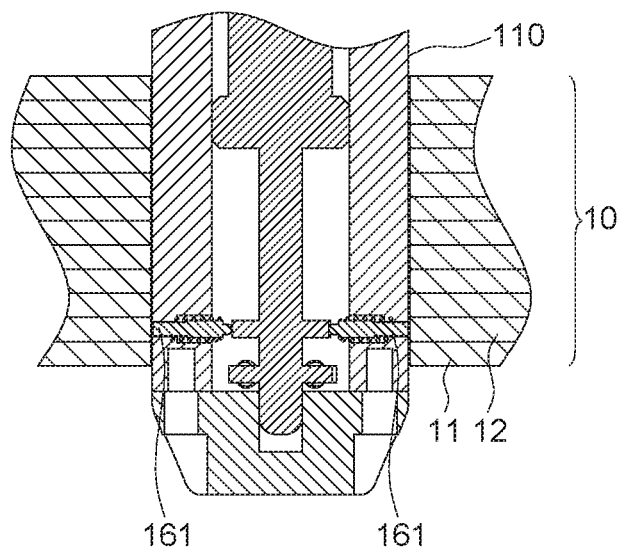

Second Operating State:

Refer to FIGS. 1B and 3A-3D. FIGS. 3A and 3B respectively are schematic diagrams of first movable parts 151 and second movable parts 161 when the disc grabbing device 100 is in a second operating state. FIGS. 3C and 3D respectively are cross-sectional views of the disc grabbing device 100 along a cross-sectional line A-A of FIG. 3A and a cross-sectional line B-B of FIG. 3B. The drive shaft 120 drives the first cam 130 and the second cam 140 to rotate to drive the disc grabbing device 100 from the first operating state to the second operating state. When the disc grabbing device 100 is in the second operating state, the first ends 151a of the first movable parts 151 are located at first contact points P2 on corresponding first drive contours 131, and the first ends 161a of the second movable parts 161 are located at first contact points Q2 on corresponding second drive contours 141. The initial point P1 and the first contact point P2 on the first drive contours 131 form a first angle A1 with respect to the center O of the drive shaft 120. The initial point Q1 and the first contact point Q2 on the second drive contours 141 form the first angle A1 with respect to the center O of the drive shaft 120.

As indicated in FIGS. 3A-3D, when the disc grabbing device 100 is in the second operating state, the first movable parts 151 are located at the disc hold position, and the second movable parts 161 are located at the disc release position. That is, the second ends 151b of the first movable parts 151 are located outside the body 110, but the second ends 161b of the second movable parts 161 are located inside the body 110. As indicated in FIGS. 2C and 3C, when the disc grabbing device 100 is in the first operating state, the body 110 of the disc grabbing device 100 can be inserted into the center hole of the multiple discs 10 and prepares to grab discs. Then, the disc grabbing device 100 is switched to the second operating state. Since the second ends 151b of the first movable parts 151 are located outside the body 110, the discs 10 can lean on the second ends 151b of the first movable parts 151, and the disc grabbing device 100 can complete the operation of grabbing the discs. Then, the disc grabbing device 100 can move the grabbed discs 10 to a corresponding disc drive and prepares to unload a disc.

Figure 4A:
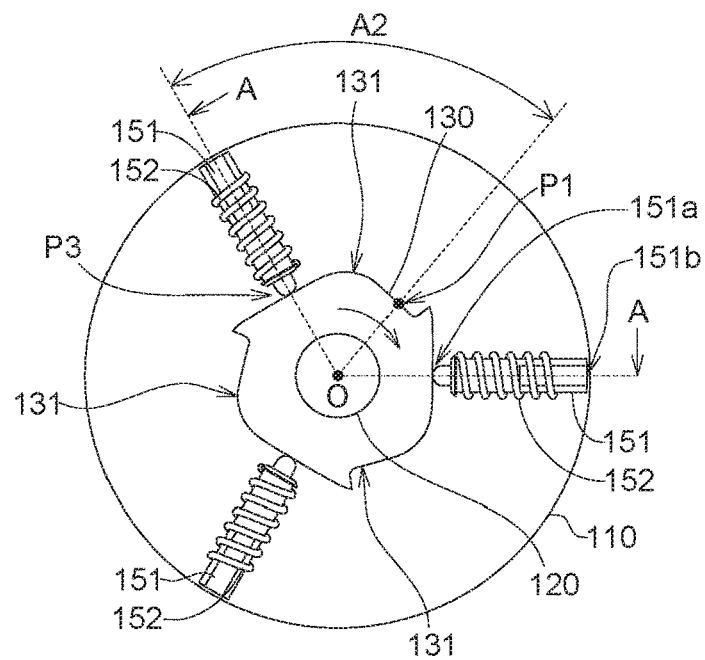
FIGS. 4A and 4B respectively are schematic diagrams of first movable parts and second movable parts when a disc grabbing device is in a third operating state.
Figure 4B:
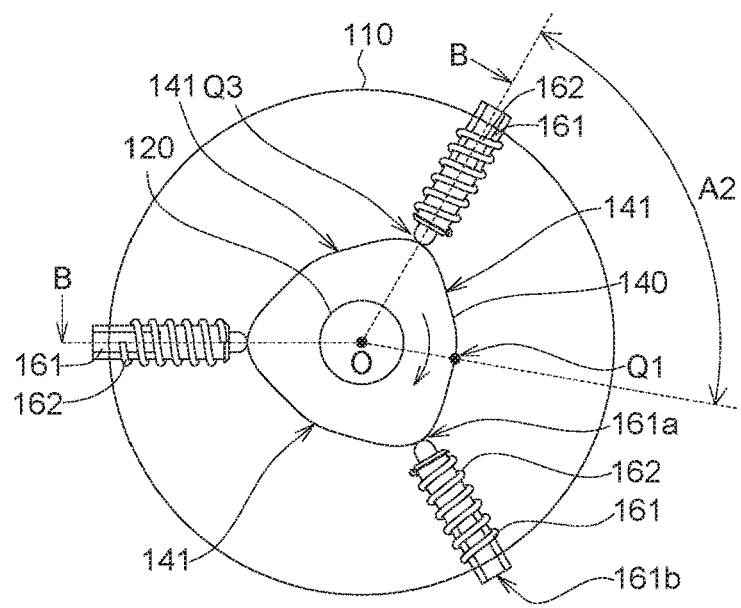
Figure 4C:
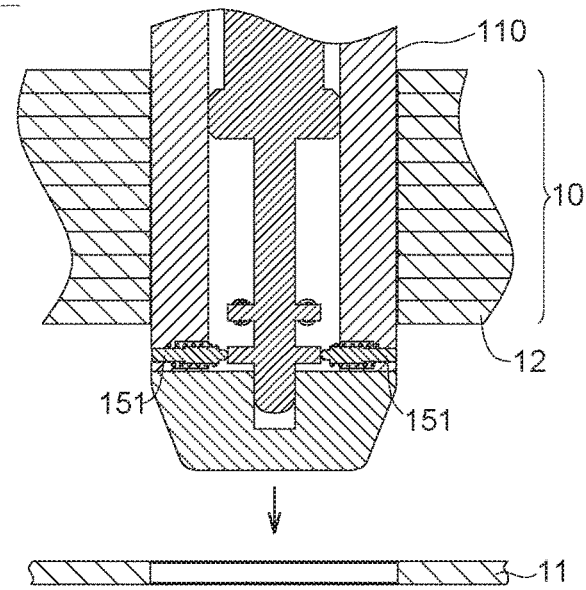
FIGS. 4C and 4D respectively are cross-sectional views of a disc grabbing device along a cross-sectional line A-A of FIG. 2A and a cross-sectional line B-B of FIG. 4B.
Figure 4D:
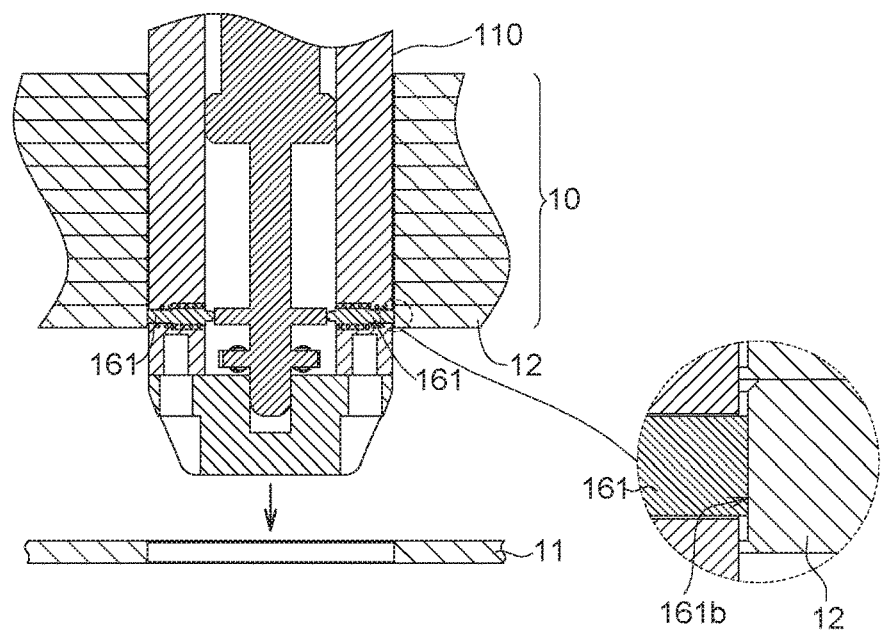

Third Operating State:

Referring to FIGS. 1B and 4A-4D, wherein FIGS. 4A and 4B respectively are schematic diagrams of first movable parts 151 and second movable parts 161 when the disc grabbing device 100 is in a third operating state. FIGS. 4C and 4D respectively are cross-sectional views of the disc grabbing device 100 along a cross-sectional line A-A of FIG. 4A and a cross-sectional line B-B of FIG. 4B. The drive shaft 120 drives the first cam 130 and the second cam 140 to rotate to drive the disc grabbing device 100 from the second operating state to the third operating state. When the disc grabbing device 100 is in the third operating state, the first ends 151a of the first movable parts 151 are located at second contact points P3 on corresponding first drive contours 131, and the first ends 161a of the second movable parts 161 are located at second contact points Q3 on corresponding second drive contours 141. The initial point P1 and the second contact point P3 on the first drive contours 131 form a second angle A2 with respect to the center O of the drive shaft 120. The initial point Q1 and the second contact point Q3 on the second drive contours 141 form the second angle A2 with respect to the center O of the drive shaft 120.

As indicated in FIGS. 4A-4D, when the disc grabbing device 100 is in the third operating state, the first movable parts 151 are located at the disc release position, and the second movable parts 161 are located at the disc hold position. That is, the second ends 151b of the first movable parts 151 are located inside the body 110, but the second ends 161b of the second movable parts 161 are located outside the body 110 and can lean on the inner edge of the center hole of the corresponding disc 10, such that the disc 10 pressed by the second ends 161b will be clamped on the body 110 and will not drop down.

As disclosed above, when the disc grabbing device 100 grabs the discs 10, the position of the second movable parts 161 corresponds to the second disc of the grabbed discs 10 counted from the bottom side. As indicated in FIG. 3D, when the disc grabbing device 100 is in the second operating state, after the disc grabbing device 100 completes the operation of grabbing multiple discs, the position of the second movable parts 161 corresponds to the second disc 12. Therefore, when the disc grabbing device 100 enters the third operating state, the second ends 161b of the second movable parts 161 located outside the body 110 will lean on the inner edge of the center hole of the second disc 12 (as indicated in the enlargement of FIG. 4D), such that the second disc 12 will be clamped on the body 110 and will not drop down. Meanwhile, since the first movable parts 151 are located at the disc release position, the first disc 11 located under the second disc 12 cannot lean on the second ends 151b of the first movable parts 151 and will be unloaded. Thus, the operation of unloading a disc is completed.

Figure 5A:
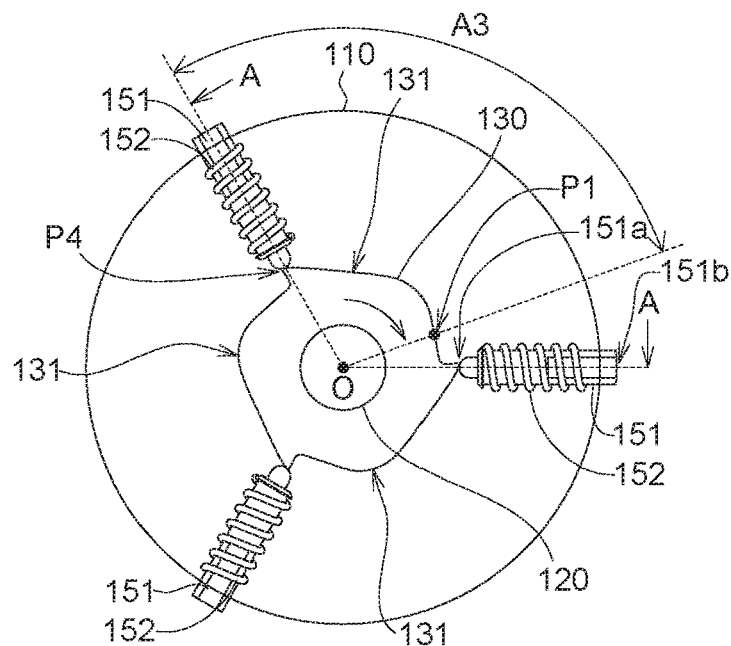
FIGS. 5A and 5B respectively are schematic diagrams of first movable parts and second movable parts when a disc grabbing device is in a fourth operating state.
Figure 5B:
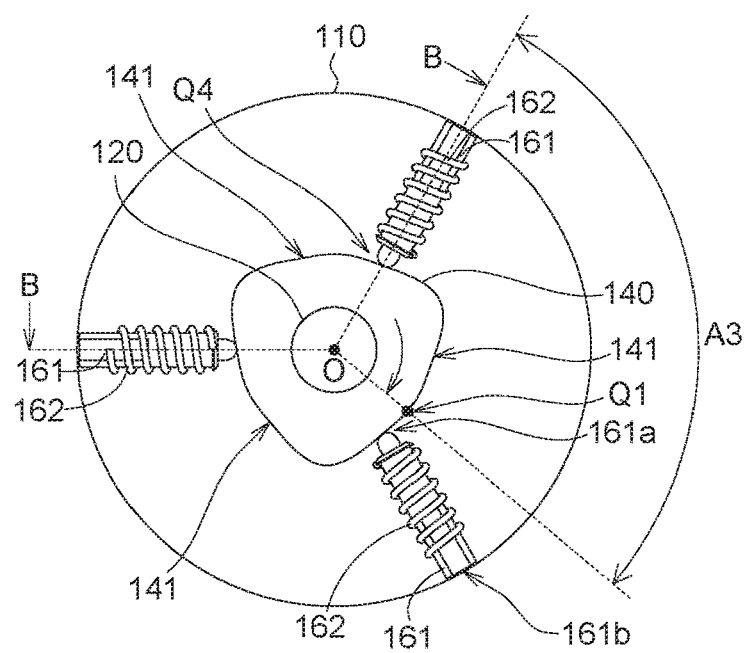
Figure 5C:
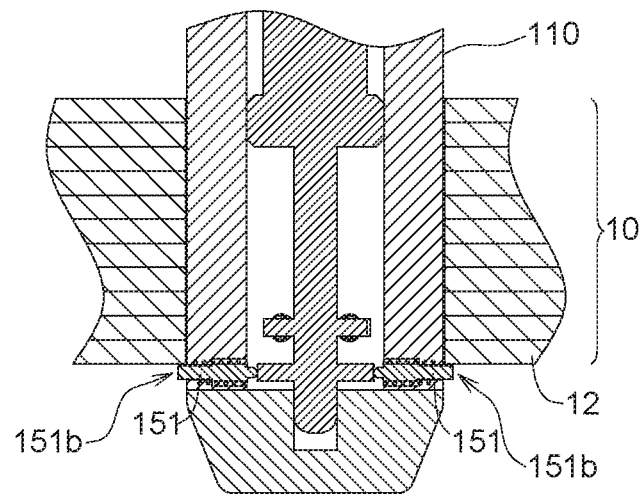
FIGS. 5C and 5D respectively are cross-sectional views of a disc grabbing device along a cross-sectional line A-A of FIG. 5A and a cross-sectional line B-B of FIG. 5B.
Figure 5D:
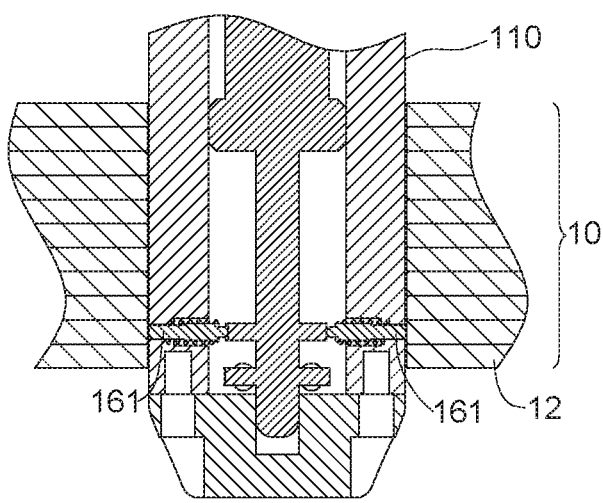

Fourth Operating State:

Refer to FIGS. 5A-5D. FIGS. 5A-5B respectively are schematic diagrams of first movable parts 151 and second movable parts 161 when the disc grabbing device 100 is in a fourth operating state. FIGS. 5C and 5D respectively are cross-sectional views of a disc grabbing device along a cross-sectional line A-A of FIG. 5A and a cross-sectional line B-B of FIG. 5B. The drive shaft 120 drives the first cam 130 and the second cam 140 to rotate to drive the disc grabbing device 100 from the third operating state to the fourth operating state. When the disc grabbing device 100 is in the fourth operating state, the first ends 151a of the first movable parts 151 are located at third contact points P4 on corresponding first drive contours 131, and the first ends 161a of the second movable parts 161 are located at third contact points Q4 on corresponding second drive contours 141. The initial point P1 and the third contact point P4 on the first drive contours 131 form a third angle A3 with respect to the center O of the drive shaft 120. The initial point Q1 and the third contact point Q4 on the second drive contours 141 form the third angle A3 with respect to the center O of the drive shaft 120.

As indicated in FIG. 5A-5D, when the disc grabbing device 100 is in the fourth operating state, the first movable parts 151 are located at the disc hold position, and the second movable parts 161 are located at the disc release position. That is, the second ends 151b of the first movable parts 151 are located outside the body 110, but the second ends 161b of the second movable parts 161 are located inside the body 110. Since the second ends 151b of the first movable parts 151 are located outside the body 110 and the second ends 161b of the second movable parts 161 are located at the disc release position, the multiple discs 10 can lean on the second ends 151b of the first movable parts 151. When the disc grabbing device 100 enters the fourth operating state from the third operating state, the second disc 12 pressed by the second ends 161b of the second movable parts 161 in the third operating state will be released to lean on the second ends 151b of the first movable parts 151. Then, the disc grabbing device 100 can move the grabbing discs 10 to the next corresponding disc drive and prepares to unload a disc again.

It should be noted that when the disc grabbing device 100 is in the fourth operating state and the second operating state, the position of the first movable parts 151 and the position of the second movable parts 161 are identical. That is, the first movable parts 151 are all located at the disc hold position, and the second movable parts 161 are all located at the disc release position. It can be known from above disclosure that when the disc grabbing device 100 performs the operation of unloading a disc for one time, the first movable parts 151 start from the disc hold position, and the second movable parts 161 start from the disc release position (as indicated in the fourth operating state and the second operating state). Then, the first movable parts 151 move to the disc release position, and the second movable parts 161 move to the disc hold position (as indicated in the third operating state). Then, the first movable parts 151 return to the disc hold position, and the second movable parts 161 return to the disc release position (as indicate in the fourth operating state and the second operating state). Thus, an operation of unloading a disc is completed.

In an embodiment, when the disc grabbing device 100 is in the second operating state, the corresponding first angle A1 is such as 30°; when the disc grabbing device 100 is in the third operating state, the corresponding second angle A2 is such as 70°; when the disc grabbing device 100 is in the fourth operating state, the corresponding third angle A3 is such as 110°. In this embodiment, the disc grabbing device 100 starts with the second operating state to performing first time operation of unloading a disc. After the drive shaft 120 drives the first cam 130 and the second cam 140 to rotate forwardly, the disc grabbing device 100 enters the fourth operating state from the third operating state to complete an operation of unloading a disc.

And then, the next time operation of unloading a disc starts with the fourth operating state. After the drive shaft 120 drives the first cam 130 and the second cam 140 to rotate reversely, the disc grabbing device 100 enters the second operating state from the third operating state to complete an operation of unloading a disc. Then, the next time operation of unloading a disc starts with the second operating state again. After the drive shaft 120 drives the first cam 130 and the second cam 140 to rotate forwardly, the disc grabbing device 100 enters the fourth operating state from the third operating state to complete an operation of unloading a disc again. The rest can be obtained by the same analogy.

In another embodiment, when the disc grabbing device 100 is in the second operating state, the corresponding first angle A1 is such as 30°; when the disc grabbing device 100 is in the third operating state, the corresponding second angle A2 is such as 70°; when the disc grabbing device 100 is in the fourth operating state, the corresponding third angle A3 is such as 30°. In other words, the first contact point P2 and the third contact point P4 on the first drive contours 131 are located at the same position on the first drive contours 131, and the first contact point Q2 and the third contact point Q4 on the second drive contours 141 are located at the same position on the second drive contours 141.

In this embodiment, the disc grabbing device 100 may start with the second operating state to performing one time operation of unloading a disc. After the drive shaft 120 drives the first cam 130 and the second cam 140 to rotate forwardly, the disc grabbing device 100 enters the third operating state. And then, the drive shaft 120 drives the first cam 130 and the second cam 140 to rotate reversely, the disc grabbing device 100 enters the fourth operating state, that is, returns to the second operating state to complete one time operation of unloading a disc. The above steps are repeated to perform the next time operation of unloading a disc.

When the disc grabbing device 100 wants to grab discs, the disc grabbing device 100 enters the first operating state, such that the first movable parts 151 and the second movable parts 161 are respectively located at an initial position. That is, the first movable parts 151 and the second movable parts 161 both are located at the disc release positions, so that the body 110 of the disc grabbing device 100 can insert into the center holes of the discs 10. Then, the disc grabbing device 100 enters the second operating state in which the first movable parts 151 are located at the disc hold position and the second movable parts 161 are located at the disc release position. Thus, the operation of grabbing the discs is completed.

According to above embodiments of the invention, the disc grabbing device and the operating method thereof are capable of grabbing and unloading discs using a dual-cam mechanism and an engage-and-release configuration between two corresponding sets of movable parts such that discs can be clamped or released. In comparison to the conventional discs grabbing system, the disc grabbing device of the present embodiment achieves a grabbing function by controlling moveable parts to move forward and backward using cams, and therefore simplifies the assembly structure. Besides, the disc grabbing device of the present embodiment can concurrently control dual cams by controlling the rotation direction and angel of the drive shaft, and therefore can effectively simplify the grabbing operation of the discs.

While the invention has been described by way of example and in terms of the preferred embodiment(s), it is to be understood that the invention is not limited thereto. On the contrary, it is intended to cover various modification and similar arrangements and procedures, and the scope of the appended claims therefore should be accorded the broadest interpretation so as to encompass all such modification and similar arrangements and procedures.

What is claimed is:

1. A disc grabbing device used for grabbing a plurality of discs and sequentially unloading the discs, the disc grabbing device comprising:
    a body;
    a drive shaft rotatably disposed in the body;
    a first cam and a second cam disposed on the drive shaft, wherein the first cam and the second cam are rotated together with the drive shaft;
    a plurality of first movable parts disposed in the body and corresponding to the first cam, wherein the first movable parts move to a disc hold position or a disc release position along with a rotation of the first cam; and
    a plurality of second movable parts disposed in the body and corresponding to the second cam, wherein the second movable parts move to the disc release position or the disc hold position along with a rotation of the second cam;
    wherein the disc grabbing device has a first operating state in which the first movable parts and the second movable parts are located at the disc release positions;
    wherein the disc grabbing device has a second operating state in which the first movable parts are located at the disc hold position and the second movable parts are located at the disc release position;
    wherein the disc grabbing device has a third operating state in which the first movable parts are located at the disc release position and the second movable parts are located at the disc hold position.

2. The disc grabbing device according to claim 1, wherein the positions of the first movable parts correspond to an underneath of the position of a first disc of the grabbed discs counted from bottom side, and the position of the second movable parts correspond to the position of a second disc of the grabbed discs counted from bottom side.

3. The disc grabbing device according to claim 1, wherein the drive shaft drives the first cam and the second cam to rotate, such that the disc grabbing device switches among the first operating state, the second operating state and the third operating state.

4. The disc grabbing device according to claim 1, further comprising:
    a plurality of first elastic parts disposed corresponding to the first movable parts for providing an elastic force to the corresponding first movable parts, such that the first movable parts return to the disc release position; and
    a plurality of second elastic parts disposed corresponding to the second movable parts for providing an elastic force to the corresponding second movable parts, such that the second movable parts return to the disc release position.

5. The disc grabbing device according to claim 1, wherein when the first movable parts are located at the disc release position, first ends of the first movable parts are located inside the body; when the first movable parts are located at the disc hold position, the first ends of the first movable parts is located outside the body; when the second movable parts are located at the disc release position, first ends of the second movable parts are located inside the body; when the second movable parts are located at the disc hold position, the first ends of the second movable parts are located outside the body.

6. The disc grabbing device according to claim 1, wherein the first cam has a plurality of first drive contours corresponding to the first movable parts respectively leaning on the corresponding first drive contours, and when the first cam rotates, the first drive contours lead the first movable parts to move;
    the second cam has a plurality of second drive contours corresponding to the second movable parts respectively leaning on the corresponding second drive contours, and when the second cam rotates, the second drive contours lead the second movable parts to move.

7. The disc grabbing device according to claim 1, wherein the first movable parts are staggered with the second movable parts.

8. An operating method of a disc grabbing device comprising a drive shaft, a first cam and a second cam disposed on the drive shaft, a plurality of first movable parts corresponding to the first cam, and a plurality of second movable parts corresponding to the second cam, the operating method comprising steps of:
    when the disc grabbing device intends to grab a plurality of discs, driving the first cam and the second cam to rotate by the drive shaft, such that the disc grabbing device enters a first operating state in which the first movable parts and the second movable parts are located at a disc release position;

driving the first cam and the second cam to rotate by the drive shaft, such that the disc grabbing device enters a second operating state to complete the operation of grabbing the discs, wherein in the second operating state, the first movable parts are located at a disc hold position, and the second movable parts are located at the disc release position;

when the disc grabbing device intends to unload one of the grabbed discs, driving the first cam and the second cam to rotate by the drive shaft, such that the disc grabbing device enters a third operating state in which the first movable parts are located at the disc release position, and the second movable parts are located at the disc hold position; and driving the first cam and the second cam to rotate by the drive shaft, such that the disc grabbing device enters the second operating state to complete the operation of disc unloading.

9. The operating method of a disc grabbing device according to claim 8, wherein when the disc grabbing device intends to unload one of the grabbed discs, the drive shaft drives the first cam and the second cam to rotate forwardly, such that the disc grabbing device enters the third operating state from the second operating state; and the drive shaft drives the first cam and the second cam to rotate forwardly, such that the disc grabbing device enters the second operating state, to complete the operation of disc unloading from the third operating state.

10. The operating method of a disc grabbing device according to claim 9, wherein when the disc grabbing device intends to unload one of the discs again, the drive shaft drives the first cam and the second cam to rotate reversely, such that the disc grabbing device enters the third operating state from the second operating state; and the drive shaft drives the first cam and the second cam to rotate reversely, such that the disc grabbing device enters the second operating state from the third operating state to complete the operation of disc unloading.

* * * * *